United States Patent Office 3,440,507
Patented Apr. 22, 1969

3,440,507
VARIABLE SPEED ELECTRIC DRIVE HAVING GAIN COMPENSATION
Robert P. Derrick, Decatur, Ga., and Hermann Eisele, Amherst, Willliamsville, N.Y., assignors to Westinghouse Electric Corporation, Pittsburgh, Pa., a corporation of Pennsylvania
Filed Mar. 17, 1967, Ser. No. 623,930
Int. Cl. H02p 5/20, 7/34, 7/66
U.S. Cl. 318—152                9 Claims

ABSTRACT OF THE DISCLOSURE

Variable-speed drive including motors M1, M2, M3, whose armatures A1, A2, A3 are supplied from a generator G controlled, to deliver different voltages for different motor speeds, by setting a master reference MR. The motors are regulated by current loops and speed loops which control the field currents F1, F2, F3. The parameters of the current loop, P1, or of the speed loop R6 and P2, for each motor automatically follow the setting of the master reference so that variations of the gain at different speeds are compensated for.

---

This invention relates to electric drives and has particular relationship to such drives in which the speed of the drive is regulated. Specifically, this invention concerns itself with motor drives on which the armature of the motor is supplied by a generator and the speed is set by setting the voltage of the generator and is regulated by controlling the field of the motor. Typically, such drives are used in paper machines of the sectional-drive type in which the various components of the paper machine are driven by separate motors which are supplied in parallel from a common generator and the fields of which are separately controlled for regulation purposes. The motors could also be supplied from a commercial supply through a static AC-to-DC converter.

It is an object of this invention to provide a drive the speed of which shall be variable over a wide range and shall be regulatable with reasonable precision.

In the drive with which this invention concerns itself, the generator voltage is controlled by a master reference which sets the voltage of the generator. The one or more motors supplied from this generator have a speed depending on the generator voltage and this speed is regulated. The regulation is effected for each motor by an associated speed controller and a current controller. In the input to each speed controller, the voltage of a tachometer connected to the associated motor is compared to a voltage derived from the master reference. The output of each speed controller supplies a voltage which is compared to a potential dependent on the current conducted by the armature of the associated motor. Each current controller supplies the field winding of the associated motor.

The regulating apparatus for each motor has an outer regulating loop including the speed controller and an inner regulating loop including the current controller. For satisfactory system stability, the outer loop must be substantially slower than the inner loop; typically, a 2:1 ratio must be maintained between the response time of the outer or speed loop and the response time of the inner or current loop. In drives in accordance with the teachings of the prior art, the regulator system is set to meet the most adverse conditions to be anticipated as regards response time. Typically, the speed loop is set to have a response time equal at least to twice the slowest response time of the current loop that is encountered over the range of operation of the drive. This prior art apparatus has in the past operated satisfactorily for drives having a relatively low or moderate speed range and also for drives having a substantial speed range but demanding only moderate precision in speed regulation. Prior art drives of the type just described have proved unsatisfactory for precision speed regulation particularly over a wide range of speeds.

It is, accordingly, an object of this invention to overcome the disadvantages of the prior art and to provide a drive, variable in speed over a wide range, which shall be capable of precision speed regulation.

This invention arises from the realization that the desired precision speed regulation may be achieved by eliminating the compromise in the setting of the responses of the loops and by automatically setting the response of one loop in dependence upon the speed of the drive. In accordance with this invention, a drive is provided which includes one or more motors the armature voltage of which is supplied from a generator in accordance with the setting of the master reference and the speed of which is regulated by controlling the field of the motor or motors and the speed regulating means for each motor includes follow compensating means for compensating for the variation in gain in the regulating means introduced by reason of the changing speeds. The follow compensating means is automatically responsive to the setting of the master reference to be set correspondingly to effect the compensation. The follow compensation may be effected on the current loop or speed loop. An aspect of this invention is the discovery that the follow compensation can be effected on the current controller by varying only one impedance.

In the practice of this invention, the current controller is controlled from an armature-current dependent signal derived from a shunt in the armature circuit which is impressed on the input of the controller through an amplifier and through a sensor network. The current controller supplies the field of the motor through a power amplifier. The frequency responses of the principal components of this current loop may be defined by the following Equations 1, 2 and 3.

Current controller:

$$\frac{\dfrac{u_a}{u_v}}{\dfrac{u}{u_v}} = \frac{(1+sT_{01})(1+sT_{03})}{sT_C(1+sT_{02})} \qquad (1)$$

Power amplifier:

$$\frac{\dfrac{U_f}{U_{fR}}}{\dfrac{u_a}{u_v}} = \frac{K_P}{1+sT_P} \qquad (2)$$

Current feedback amplifier:

$$\frac{\dfrac{u_i}{u_v}}{\dfrac{I}{I_{St}}} = \frac{K_i}{1+sT_i} \qquad (3)$$

In these equations:

$u$=input voltage to current controller
$u_v$=a normalizing voltage
$u_a$=output voltage from the current controller
$s$=Laplace operator
$T_{01}$=major lead of current controller
$T_{03}$=minor lead of current controller
$T_{02}$=fixed lag of current controller
$T_C$=integration time constant current controller dependent on the speed of the drive $U_f$=excitation voltage of the field of the regulated motor
$U_{fR}$=rated excitation voltage of this field
$K_P$=the gain of the power amplifier
$T_P$=the time constant of the power amplifier
$u_i$=the voltage derived through the armature current sensor and supplied to the input of the current controller
$I$=current of the armature of the regulated motor at any setting
$I_{St}$=stall current of the armature
$K_i$=gain of the sensor network of the current loop
$T_i$=time constant of the senosr loop $T_C$ above is the integration time constant of the current controller. $T_C$ represents the gain of the time-integral portion of the output of the current controller.

The optimizing equations are as follows:

$$\sigma = T_{02} + T_1 + T_P \qquad (4)$$
$$T_{01} = T \qquad (5)$$
$$T_{03} = T_A \qquad (6)$$
$$T_C = 2\sigma K_i K_P K C_{mnx.} \qquad (7)$$

In Equations 4 through 7

$\sigma$=sum of the small time constants of the current loop
$T$=time constant of the motor field
$T_A$=armature time constant
$K$=gain in motor assuming the field excitation voltage to be input and armature flux to be output
$C_{max.}$=normalized value of the maximum speed (actual speed divided by no-load speed)

Equations 5 and 6 above essentially bring out that the lead time constant $T_{01}$ compensates for the motor-field time constant and $T_{03}$ compensates for the armature time constant $T_A$.

For the factor C, the greatest occurring value has to be used; that means normally $C \approx 1$ for the rated speed. Using the optimizing Equations 4 through 7, the frequency response of the closed armature-current loop yields.

$$\frac{\frac{I}{I_{St}}}{\frac{u_c}{u_v}} = \frac{1+sT_i}{K_i} \frac{1}{1+\frac{C_{max.}}{C} 2s\sigma(1+s\sigma)} \qquad (8A)$$

$U_C$=reference voltage.

The essential time constant $$\frac{C_{max.} 2\sigma}{C}$$

is changing with the actual speed of the drive. The smallest value occurs for top speed $C = C_{max.}$ and the greatest value for minimum speed $C = C_{min.}$. The variation is determined by the speed range to be covered by the drive $\tau = C_{max.}/C_{min.}$.

The slowest transient response occurs if the drive is operated at its lowest speed which means $C = C_{min.}$. Since speed controller is, in accordance with the teachings of the prior art adjusted to cope with the worst case, and this is the slowest transient response of the armature-current loop, the response time of the overall control has to be slowed down in proportion to the speed range. If for instance the necessary speed range is 1 to 3 then the achievable response time is approximately three times as long as if the drive would be operated always at the same speed. In accordance with this invention in one of its aspects, a transient response as good as that achieved for a one-speed drive is achieved for a drive operated within a wide speed range by self-adaption of the current controller. In the practice of this invention, the integral portion of the current controller is changed by changing only a single follow impedance, the gain potentiometer of the current controller, dependent on the average speed of the drive. Under such circumstances the frequency response of the current loop has constant parameters.

The optimizing equation for the integral portion in this case becomes Equation 7 above.

$$T_C = 2\sigma K_i K_P K C \qquad (8B)$$

Only $T_C$ need be changed with the master reference and this is accomplished by setting the variable resistor P1. The frequency response of the closed current loop is now $$\frac{\frac{I}{I_{St}}}{\frac{u_c}{u_v}} = \frac{1+sT_i}{K_i} \frac{1}{1+2s\sigma(1+s\sigma)} \qquad (9)$$

In effect what happens is that the quantity $$\frac{\frac{I}{I_{St}}}{\frac{u_c}{u_v}}$$

is maintained independent of speed, in line with Equation 9, by changing the gain of the current controller so that it follows the master reference and this is achieved typically by connecting the gain potentiometer of the controller through a servo system in follow relationship with the master reference. Typically, this follow control is suitable for a paper machine of the sectional type because the speed of a paper machine is normally changed very slowly and there are no special requirements for the servo system. The accuracy of the servo system does not influence the accuracy of the speed control because only a parameter is changed. It is realized that by the change of the integral portion of the current controller, the necessary operating range of the power amplifier supplying the excitation field increases at lower speeds. Therefore, an increase of the forcing factor of the power amplifier may be necessary, dependent on the required minimum speed.

The follow compensation may also be effected by changing the speed controller in dependence upon the change in the master reference. The parameters of the current controller are left constant in this case. With reference to a sectional paper machine drive this alternative provides a fast transient response at top speed when the transport lag between adjacent sections of the paper machine is small and a slow transient response at low speed when the transport lag is large. The ratio between transport lag and transient response thus remains constant. The frequency response of the speed controller is given by $$\frac{u_c}{u_s} = \frac{(1+sT_{11})}{sT_s} \qquad (10)$$

In this equation:

$u_s$=input voltage to speed controller
$u_c$=output of speed controller
$T_{11}$=lead time-constant of speed controller
$T_s$=integration-time constant of speed controller The optimizing equations for the speed controller are:

$$T_{11} = 8\sigma \frac{\frac{n_t}{n_o}}{1-2\frac{n_t}{n_o}D} \qquad (11)$$

$$T_s = \frac{32\sigma^2}{T_M} \frac{K_F}{K_i} \frac{\left(\frac{n_t}{n_o}\right)^2}{(1-D)\left(1-2\frac{n_t}{n_o}D\right)} \qquad (12)$$

In equations 11 and 12

$n_t$=highest operating speed
$n_o$=speed at any setting
$T_M$=the mechanical time constant of the system
$D$=ratio of rated current multiplied by the armature resistance to the rated voltage
$K_F$=gain of speed feedback network Equations 11 and 12 require that both $T_{11}$ and $T_s$ be changed with the master reference. An advantage of this alternative is that the size of the forcing factor for the power amplifier is not critical.

For a better understanding of this invention, both as to its organization and as to its method of operation, together with additional objects and advantages thereof, reference is made to the following description taken in connection with the accompanying drawings, in which.

Figure 1:
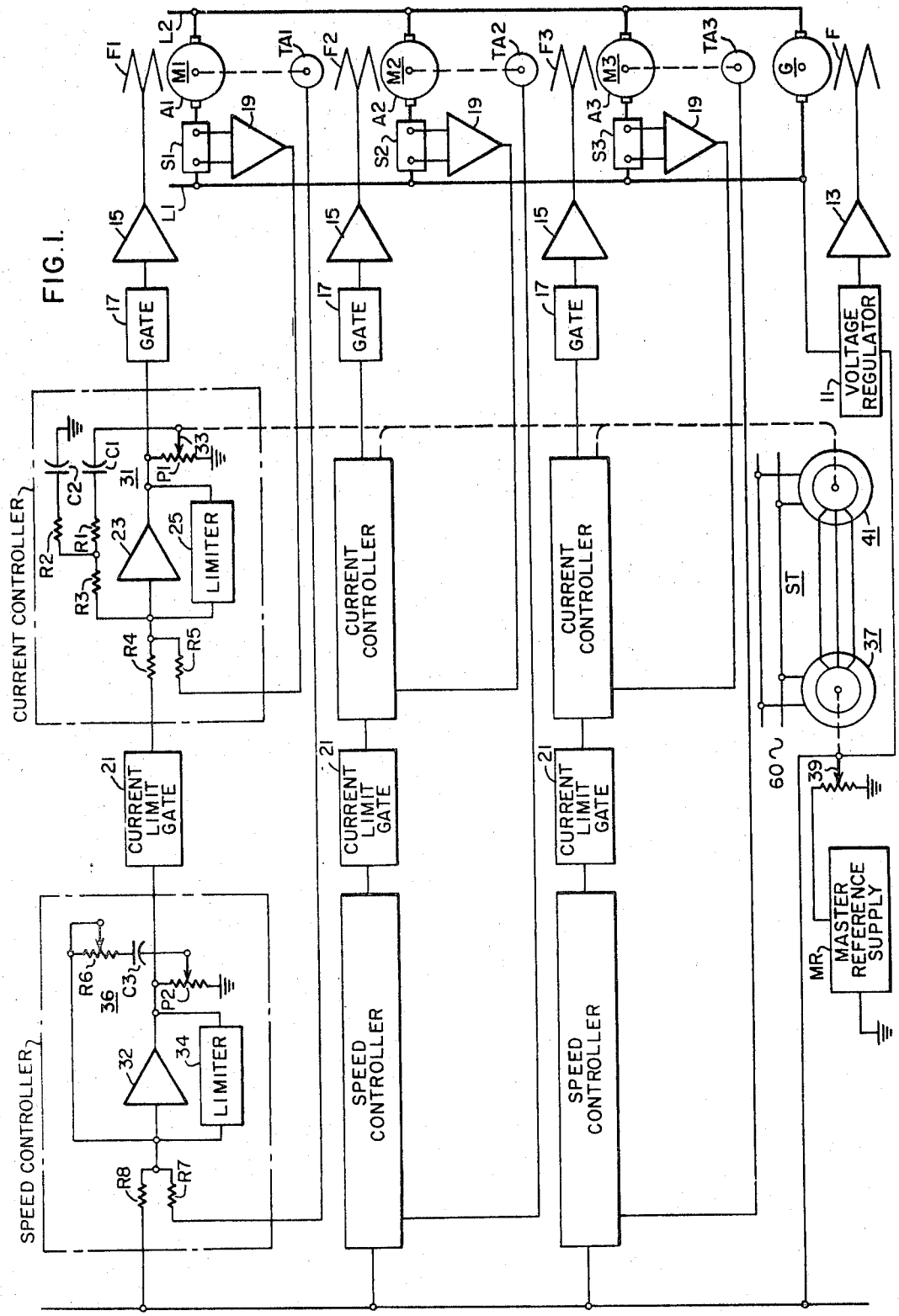
FIGURE 1 is a view partly diagrammatic and partly schematic showing a preferred embodiment of this invention in which the follow compensation is effected in the current controller.

FIG. 1 shows a drive which may serve for a paper machine of the sectional type. This drive includes a plurality of motors M1, M2, M3 which typically could drive the various sectional components of the paper machine. Each of the motors M1, M2, M3 has an armature A1, A2, A3, respectively, and a field winding F1, F2, F3, respectively. The motors M1, M2, M3 are energized from a generator G which supplies buses L1 and L2. The armatures A1, A2, A3 are connected in parallel between the buses L1 and L2 through shunts S1, S2 and S3 from which a signal proportional to the armature current is derived. The generator G is set by a master reference MR which may be a potentiometer. The potentiometer MR controls a voltage regulator 11. The voltage regulator controls the field F of the generator G through a power amplifier 13 to set the voltage between the buses L1 and L2 in accordance with the setting of the master reference MR.

The output of each motor M1, M2, M3 is regulated from an internal current loop including a current controller, a power amplifier 15 which is controlled from the current controller through a gate 17. The output of each power amplifier 15 is supplied to the field F1, F2 and F3, respectively, of the motors M1, M2 and M3. Each current controller is controlled through a sensing network including an amplifier 19 which derives an input signal from the corresponding shunt S1, S2 or S3 dependent on the armature current. The output of the amplifier 19 is supplied as an input to the current controller.

Each motor is also regulated from an external speed loop. For this loop, the shaft of each motor M1, M2, M3 drives a tachometer generator TA1, TA2 and TA3. The output potential of the tachometers TA1 through TA3 is supplied in each case to a speed controller. The output of the speed controller is in each case connected to the input of the current controller through a current-limit gate 21. The potential delivered by the gate is compared as a reference potential to the potential derived from the corresponding amplifier 19. The current-limit gate 21 limits the armature current supplied to the armatures A1, A2, A3 by limiting the reference voltage supplied through R4 to the current controller.

Specifically, each current controller includes an amplifier 23. The input of each amplifier 23 derives an error signal from the resistors R4 and R5. The resistor R4 is supplied from the associated speed controller through the associated current-limit gate 21. The resistor R5 is supplied from the output of the associated amplifier 19. The signal impressed on the input of amplifier 23 is the difference between the potentials impressed on R4 and R5. The output of amplifier 23 is also connected to supply the gate 17 for the power amplifier 15. Each amplifier 23 is provided with a limited 25 which limits its output.

Each amplifier 23 includes a negative-feedback, gain-control network 31. This network 31 includes a variable resistor P1, a capacitor C1, and resistors R1 and R3. The variable resistor P1 is connected between the output of the amplifier 23 and ground and its setting sets the gain of amplifier 23. In addition, in this feedback network 31, there is a shunt network around R1, C1 and P1 including resistor R2 and capacitor C2; capacitor C2 is connected to ground.

Each speed controller includes an amplifier 32, the input of which is supplied through resistors R7 and R8. Resistor R7 derives a potential from the tachometers TA1, TA2 or TA3 in dependence upon the speed of the motor M1, M2 or M3, respectively. The master-reference signal derived from master reference MR is transmitted through resistor R8. The difference between the master-reference potential and the potential impressed on R7 is impressed on the input of amplifier 32. The output of amplifier 32 supplies the current-limit gate 21. The output of amplifier 32 is limited by a fixed limiter 34. Where limiter 34 can be made adjustable limiter 21 may be omitted. The amplifier 32 has a gain-control feedback network 36 including variable resistors P2 and R6 and capacitor C3. The resistor P2 is connected between the output of amplifier 32 and ground.

The motors M1, M2, M3 are typically connected to different sections of a paper machine and may have different ratings. The parameters of the current controller and the speed controller (typically R7, R8, C3, C2, limiters 21 and 23, etc.), may then be different.

Referring to the speed controller in FIG. 1, the time constants which appear in Equation 10 are as follow $$T_{11}=C_3R_6$$
$$T_s=C_3R_7\alpha_2$$

where $\alpha_2$ is the setting of P2.

In follow compensation in the current loop, the arm 33 of variable resistor P1 follows master reference MR and all variable resistance P1 of the system are set automatically in accordance with the setting of the master reference MR. For this purpose, the master reference MR controls the variable resistors P1 through a synchro-tie ST the transmitter 37 of which is connected to be moved by the arm 39 of the master reference MR, when the latter is set, and whose receiver 41 is connected to drive the arm 33 of the variable resistor P1.

Figure 3:
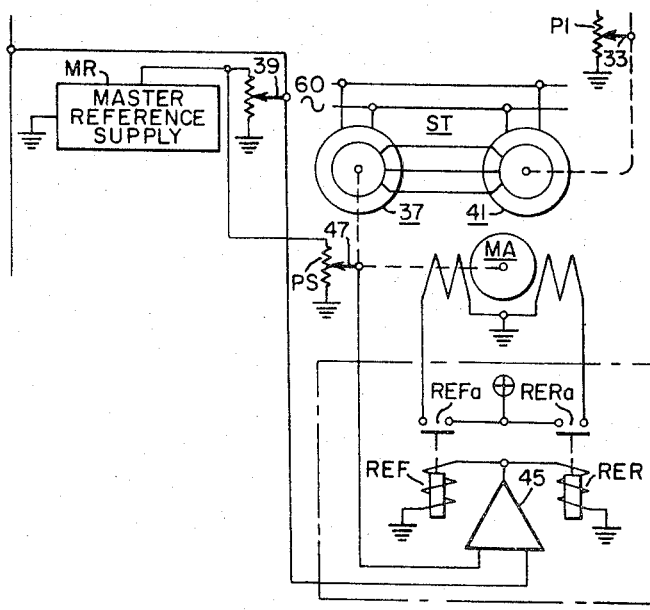
FIG. 3 is a fragmental diagrammatic view showing a further modification of this invention.

The synchro-tie ST may be replaced by other servo mechanisms, including static servo mechanisms. Typically as shown in FIG. 3, the master reference MR may set a servo controller which controls a slave variable resistor PS that in turn controls the synchro-tie ST. The voltages across the master reference MR and the slave resistor PS are connected in counteracting relationship and the resulting unbalance or error controls an amplifier 45 which in turn sets forward or reverse relays REF or RER to control the direction of auxiliary motor MA. On unbalance between the settings of MR and PS actuates relay REF or RER closing contact REFa or RERa and rotating the arm 47 of slave resistor PS until a balance is achieved. The synchro-transmitter 37 is correspondingly actuated and this in turn operates the arm 33 of the variable resistor P1.

The setting of the variable resistor P1 sets the time-constant $T_c$.

$$T_c=R_5C_1\alpha_1$$

where $\alpha_1$ is the setting of P1. The setting of P1 with relationship to the master reference MR should be such that as the master reference is set for lower speeds the gain of the amplifier 23 is increased.

Figure 4:
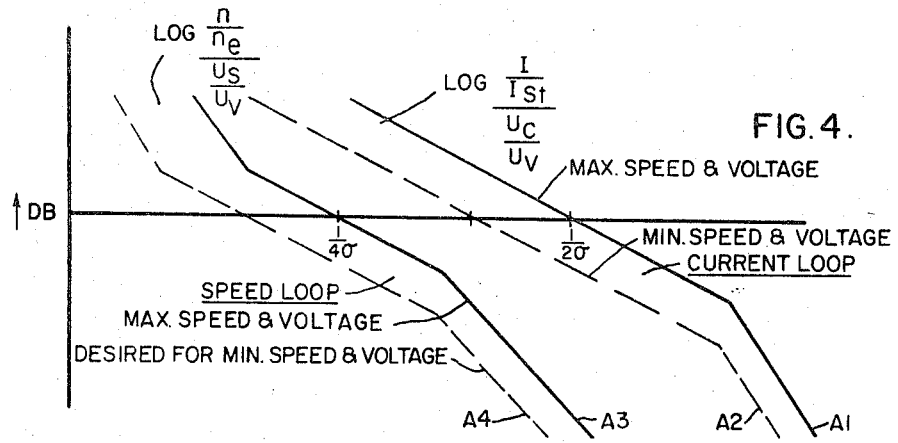
FIG. 4 is a graph illustrating the relationship between this invention and the prior art.

The advantage achieved in the practice of this invention as shown in FIGS. 1 and 3 is demonstrated in FIG. 4 which is a Bode diagram for the apparatus disclosed. In this view, the logarithm of the ratio of the normalized armature current to the normalized current controller reference voltage is plotted vertically, for the current loop assumed to be open (curves A1 and A2), and the ratio of the normalized speed to the normalized Speed Controller reference voltage is plotted, for the speed loop assumed to be open (curves A3 and A4) and the logarithm of the angular frequence is plotted horizontally. Full line curves are plotted for operation of a motor M1–M3 at maximum speed and broken-line curves for operation of this motor M1–M3 at minimum speed. For stability, the crossover point for the current loop, wherever the apparatus is operating, should occur at about twice the angular frequency of the crossover point of the speed loop. Typically as shown, the crossover point for maximum speed may occur at a frequency of $1/2\sigma$ for the current loop and $1/4\sigma$ for the speed loop. When the operation is changed to a lower speed, the Bode curve for the current loop shifts, in the practice of the prior art, from the full-line position to the broken-line position; that is, to a lower frequency. The Bode curve for the speed loop must then be correspondingly shifted to a lower period so that the crossover point for the speed loop remains at twice the frequency of the crossover point for the current loop.

In accordance with the teachings of the prior art the speed loop is set, for all speed operations of the motors M1–M3, so as to maintain at least a 2:1 ratio of the crossover frequency with respect to the minimum crossover frequency of the current loop. That is, the speed-loop must be set so as to correspond to the broken-line curve A4 of FIG. 4 for all circumstances. At this setting the response of the apparatus is slow. In accordance with this invention as shown in FIGS. 1 and 3, the output of the current controller is automatically set to follow the setting of the master reference so that the speed loop may have a relatively high response time. The automatic follow variation of P1 so continuously sets the gain that the full line A1 of the Bode diagram represents the operation of the current loop. The speed controller may then be so set that its operation corresponds to the full line A3 of the Bode diagram (FIG. 4).

Figure 2:
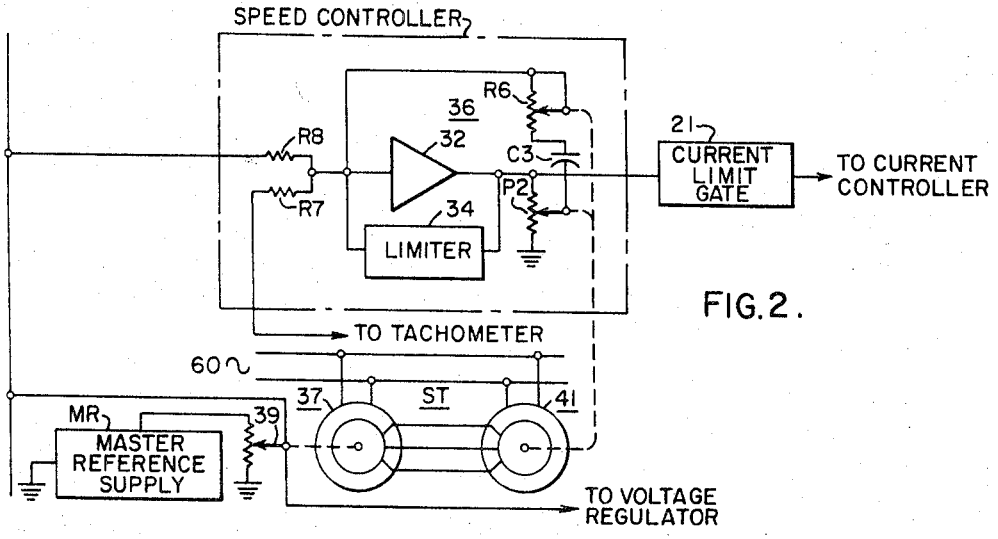
FIG. 2 is a fragmental view partly diagrammatic and partly schematic of a modification of this invention in which the follow compensation is effected in the speed controller.

In the modification of this invention shown in FIG. 2, the follow control is applied to each speed loop. In this case, the slave synchro 41 varies both the resistors P2 and R6 nonlinearly in accordance with Equations 11 and 12 so as to continuously set the speed loop to correspond to the speed setting of the corresponding motor M1, M2 or M3. For this purpose resistors R2 and R6 could be wound appropriately nonlinear or appropriate function generators could be interposed in the variable-resistor setting mechanism. This control has the advantage that, although the crossover frequency of the current loop is changing, it maintains a constant ratio between the crossover frequencies of current and speed loops.

The following summary is presented to aid those skilled in the art in practicing this invention.

This invention is directed to the self-adaption of a regulator control to accept changing operating conditions of a drive. Examples of such changes include gain changes of DC machines and changes of inertias of the load. In contrast, in accordance with the teachings of the prior art, the drive design must be compromised to meet the worst of these changing conditions. A typical application of this invention is for motor-field control speed regulators for precision regulated DC drives which are operated over an overall system speed range by adjustment of machine armature voltage. Typical of this type of application is the single generator type of paper machine of the sectional drive type with either rotating or thyristor power supplies (e.g., run generator). The invention may be understood with reference to the accompanying Bode plot (FIG. 4) which illustrates the required relationship between the crossover frequency of the current loop and speed loop; . . . that is current-loop crossover approximately 2 of speed-loop crossover frequency.

The present prior-art drive has satisfactory response characteristics (speed-loop response of the order of 0.16 second) for armature voltage controlled speed regulated drives and even better for static power supplies. Earlier prior art drive response times are usually in excess of 0.30 second. The difficulty with the prior art apparatus arises when the regulator is applied to motor fields of precision speed regulated systems. In such a drive, the gain of the DC machine changes radically as the motor speed is reduced. The effect on the current loop Bode crossover frequency (FIG. 4) may be observed by considering the current-loop frequency response (closed loop) Equation 8.

$$\frac{\frac{I}{I_{st}}}{\frac{U_c}{U_v}} = \frac{1+sT_i}{K_i}\left(\frac{1}{1+2s\sigma\frac{C_{max}}{C}(1+s\sigma)}\right) \quad (8)$$

The $C_{max}/C$ factor is the speed range ratio obtained by armature voltage control. As the operating armature voltage approaches the minimum voltage, the slowest response-time occurs. To maintain satisfactory system stability, the response-time of the speed loop must be increased so as to be approximately twice the slowest response-time of the current loop. This is shown by the dashed lines of the FIG. 4 Bode plot.

In a typical prior-art regulator for generator field control with a current-loop response-time of 0.08 second, the speed loop response-time is about 0.16 second. If a regulator with this response-time is applied to a motor-field speed-regulating system which operates over a 4:1 overall speed range, the current-loop response at minimum voltage becomes approximately $4\times 0.08 = 0.32$ second and the speed response must be increased to approximately $2\times 0.32$ or 0.64 second over the entire range of speeds.

Basically, it is the object of this invention to obtain the same good response characteristic for a system operated over a speed range by armature voltage as for a system with motor field control. This is accomplished by self-adaption of the current-loop to change the value of the integral portion of the current controller dependent upon the line set speed (i.e., run generator voltage), and therein obtain constant system parameters since the change in the integral portion accommodates the change inherent in the regulated DC machine.

This self-adaption may be accomplished in several ways, among which are:

(a) Readjustment of $\alpha_1$ potentiometer P1 by a line-speed adjusting motor operated rheostat.
(b) Readjustment of $\alpha_1$ potentiometer P1 by a simple servo operator which receives its "cue" signal from the line-speed control system.
(c) Recalibration of the integral portion of the current controller by solid-state circuitry.

In the practice of alternative (a), a multiturn potentiometer is connected to, and operated with, the master reference MR (FIGS. 1 and 3). Alternative (a) may be carried out in several ways as illustrated in FIGS. 1 and 2. As shown in FIG. 1, a synchro (Selsyn) transmitter 37 is connected to the master reference MR to control the slave synchro 41 (Selsyn) in each regulator to readjust the $\alpha_1$ potentiometer P1 of each current controller. As shown in FIG. 2, a position/voltage follower servo system is connected to follow the master reference (MR) voltage.

Neither of the above alternatives requires precision accuracy nor fast servo response because the accuracy of the servo system does not influence the regulation accuracy as only a parameter of the inner current loop is changed.

With the above-described self-adaption Equation 8 for the current-loop frequency response now becomes:

$$\frac{\frac{I}{I_{ST}}}{\frac{U_c}{U_v}} = \frac{1+sT_i}{K_i}\frac{1}{1+2\sigma s(1+s\sigma)} \quad (9)$$

It must be realized that the proposed change in the current loop integrating parameter may necessitate an increase in the forcing factor of the power-amplifier.

Another alternative for obtaining adaption of the control system is to apply the follow variation to the speed controller. The parameters of the current controller are left constant in this case and two parameters of the speed controller are readjusted such that the Bode crossover frequency of the speed loop is continuously set to maintain the conventional ratio (i.e., 2:1) with the current loop crossover. This method provides fast transient response at top-line speed (i.e., voltage), when the transport lag of the product (e.g. paper sheet) between adjacent sections of the process line is short, and slow transient response at low speed, when the transport lag is long. Thus the ratio between transport lag and transient response remains essentially constant. This alternative has the disadvantage, as compared to current-loop follow (FIGS. 1 and 3), of needing two parameter adjustments one of these two parameters is a cubic function and so is somewhat more difficult to achieve; while as an advantage, the value of power-amplifier forcing factor need not be increased.

The first alternative presented (current controller follow) maintains essentially constant high performance and is readily realized, but may require additional power amplifier rating for forcing. With the second alternative (control of speed loop) transient response changes with the changing operating conditions and the setting of the parameters is more difficult to realize, but this alternative does not require additional forcing. Prior art apparatus provides the poorest performance under all operating conditions. The advantages of this invention are as follows:

(1) Greatly improved response time for motor field control speed regulators. On many applications, this will allow the application of a motor-field control in place of a generator-field control speed-regulating system . . . e.g., the insertion of a new on-machine coater configuration into an existing single generator paper machine drive.

(2) Compatible transient performance between motor-field and generator-field control speed regulators applied to the same application.

(3) The extension of the regulator into additional areas of application.

(4) The achievement of new improved system performance with standard components.

While preferred embodiments of this invention have been disclosed herein, many modifications thereof are feasible. This invention, then, is not to be restricted except insofar as is necessitated by the spirit of the prior art.

We claim as our invention:

1. A variable-speed drive including motor means having armature means and field means, a generator connected in power-supply relationship with said armature means, master-reference means for setting said generator to deliver a predetermined voltage to said armature means to set the operating speed of said motor means, speed-regulating means connected to said field means, said speed-regulating means having follow compensating means for compensating for the variation in gain of said speed-reulating means at different operating speeds of said motor means, and means automatically responsive to the setting of said master reference for correspondingly setting said follow compensating means.

2. The drive of claim 1 wherein the speed-regulating means includes an inner current regulating loop and an outer speed loop and the follow compensating means is in the current loop.

3. The drive of claim 1 wherein the speed-regulating means includes an inner current regulating loop and an outer speed loop and the follow compensating means is in said speed loop.

4. The drive of claim 1 wherein the motor means includes a plurality of motors each having an armature and a field, said armatures being supplied in parallel from the generator, and said drive also including a speed-regulating means for each field, each speed-regulating means having a separate follow compensating means.

5. The drive of claim 1 wherein the speed-regulating means has a current controller including a feedback network having resistance for setting the gain of said current controller and wherein the means automatically responsive to the setting of the master reference is connected to said feedback network and sets said resistance correspondingly to the setting of said master reference for lower feedback at lower speeds and for higher feedback at higher speeds.

6. The drive of claim 1 wherein the speed-regulating means has a speed controller including a feedback network for adjusting the transient response of the said speed controller and wherein the means automatically responsive to the setting of the master reference is connected to said network and sets said feedback network correspondingly to said master reference for a faster transient response at higher speeds of the drive and for a slower transient response at lower speeds of the drive.

7. The drive of claim 2 wherein the follow compensating means includes a single variable resistor which alone is varied automatically with the master reference to effect the compensation.

8. The drive of claim 3 wherein the follow compensating means includes a pair of variable resistors which are varied automatically with the master reference to effect the compensation.

9. The drive of claim 2 wherein the current regulating loop includes a variable-gain amplifier and the follow compensating means includes means for varying the gain of said amplifier automatically with the variation of the master reference.

References Cited

UNITED STATES PATENTS 3,192,482 6/1965 Long _____ 318—154 X
3,324,363 6/1967 Hill et al. _____ 318—6

ORIS L. RADER, *Primary Examiner.*

B. A. COOPER, *Assistant Examiner.*

U.S. Cl. X.R.

318—59, 84, 154